July 17, 1934.   R. G. ZELEDON   1,966,782

PISTON RING

Original Filed June 27, 1928

INVENTOR
RALPH G. ZELEDON

BY *Hazard and Miller*

ATTORNEYS

Patented July 17, 1934

1,966,782

UNITED STATES PATENT OFFICE 1,966,782

PISTON RING

Ralph G. Zeledon, South Pasadena, Calif.

Application June 27, 1928, Serial No. 288,704
Renewed August 23, 1932

8 Claims. (Cl. 74—109)

This invention relates to reciprocating engines, and more especially to an improved type of piston ring adapted for use with such engines.

An object of the invention is the provision of a piston ring adapted to have a marcel ring or expander interposed between the ring and its associated piston, to ensure better seating of the ring against the cylinder wall. In order to increase the efficiency of the marcel ring or expander the invention contemplates the interpositioning of a flat strip between the marcel ring and the piston ring. Since both the strip and the marcel ring or expander are composed of relatively hard steel, there is less friction therebetween than there would be between the marcel ring and the piston, which is of cast iron or other relatively soft metal, if the flat strip were not employed.

A further object is the provision of a piston ring employing a marcel ring or expander and flat strip, as described, and in which the piston ring is provided with a plurality of notches upon its inner circumference to increase the flexibility of the ring. The employment of the flat strip prevents the high points of the marcel ring or expander from fitting into the notches and accordingly serves to further increase the efficiency of the expander. A further advantage of the structure described is that pockets are formed between the piston ring and the flat strip by the notches for the reception and retention of lubricating oil, with the result that the friction between the piston and the ring is reduced to a minimum.

A still further object is the provision of a piston ring of the general character described, provided with a circumferential groove in its outer surface, this groove being of such depth that it intercepts the notches to form bleeders through the ring. Thus it may be seen that I have provided an improved method of cutting bleeders in the ring which is more expeditious than methods heretofore employed.

With the above objects in view the piston ring of the present invention presents an improvement over that of my co-pending application, Serial No. 256,337, filed February 23, 1928.

The invention possesses other objects and valuable features, some of which, with the foregoing, will be set forth in the following description of one embodiment of my invention, which is illustrated in the drawing accompanying and forming part of the specification. It is to be understood that I do not limit myself to the showing made by the said drawing and description, as I may adopt variations of the described form within the scope of my invention as determined by the subjoined claims.

Referring to the drawing.

Figure 2:
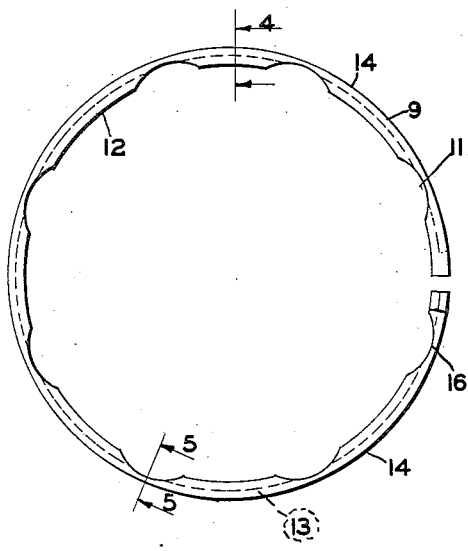
Fig. 2 is a top plan view of the ring proper, with the marcel ring and flat strip removed.
Figure 1:
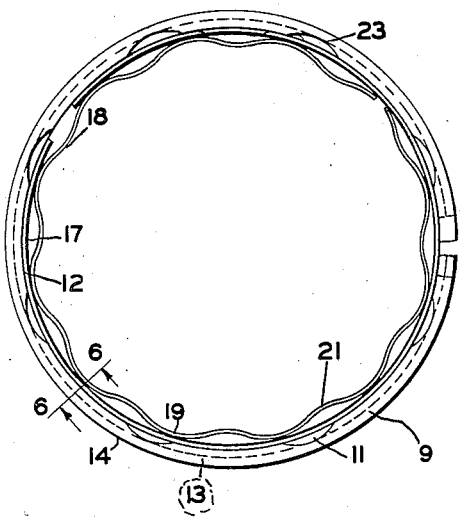
Figure 1 is a top plan view of the assembled piston ring of the present invention.
Figure 4:
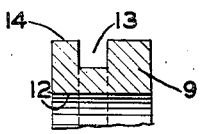
Fig. 4 is a transverse sectional view of the ring proper, the plane of section being taken upon the line 4—4 of Fig. 2.
Figure 3:
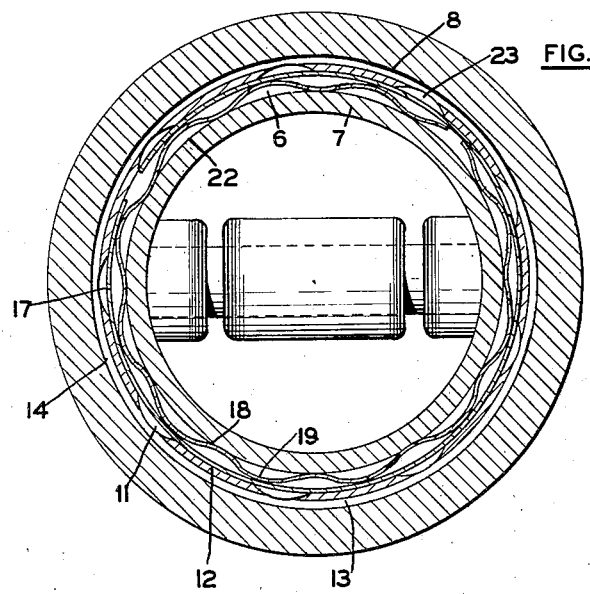
Fig. 3 is a sectional view taken horizontally through a piston and its associated cylinder, and the assembled piston ring of the invention in operative position.
Figure 5:
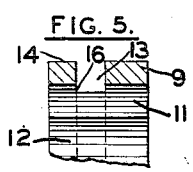
Fig. 5 is a transverse sectional view, the plane of section being taken upon the line 5—5 of Fig. 2.
Figure 6:
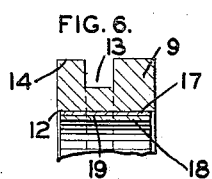
Fig. 6 is a transverse sectional view of the assembled ring, the plane of section being taken upon the line 6—6 of Fig. 1.

Considering the invention in its broad conception, the piston ring assembly comprises a ring proper, of such dimensions that it is receivable within a ring groove of a piston and adapted to be reciprocated by the piston within the cylinder of a reciprocating engine. It is to be understood that the ring finds utility in conjunction with reciprocating engines of all types, but that it is especially adapted for use in internal combustion engines. A marcel ring or expander is provided, which is adapted to be interposed between the piston ring proper and the bottom of the ring groove in the piston; and a flat strip is interposed between the marcel ring and the piston ring to increase the efficiency of the marcel ring expander and hence of the piston ring assembly.

Specifically describing the invention in its preferred form, it is shown mounted in operative position in a ring groove 6 of a piston 7, which is reciprocable within the cylinder 8 of a reciprocating engine.

The ring proper 9 is preferably composed of cast iron, as is customary. It is to be understood that the ring 9 is of such width as to afford the proper clearance between the ring 9 and the sides of the groove 6, so that movement of the ring 9 within the groove 6 is possible.

A plurality of notches 11 is formed in the inner circumference 12 of the ring 9, to increase the flexibility thereof. I have found that a maximum of flexibility may be imparted to the ring with a minimum decrease in the strength thereof by forming the notches 11 rounding, as best shown upon Fig. 2. A circumferential groove 13 is cut in the outer face 14 of the ring 9, and this groove is of such depth that it intercepts all of the notches 11, with the result that apertures or bleeders 16 are provided, these bleeders extending through the ring from its outer face 14 of the notches 11 in its inner face 12.

A flat strip 17, preferably of resilient metal, such as good quality steel, is curled into the form of a circle and placed inside the ring proper 9, after which a marcel ring 18, preferably also resilient metal, is curled into the form of a sinuous circle.

When the ring assembly described is seated in a ring groove 6 of a piston 7, the crests 19 of the marcel ring 18 will press against the flat strip 17, and the bottoms 21 of the marcel ring 18 will press against the bottom 22 of the ring groove 6. The natural resiliency of the material of which the marcel ring is composed will urge the cast iron ring outwards against all portions of the wall of the cylinder 8. This will result in expanding the ring to establish a more nearly perfect seal with the cylinder wall than would be the case if such expanding means were not provided.

This feature will take care of not only a tapered cylinder wherein the diameter of the cylinder is different throughout the length of the stroke, but it will also force a portion of the ring outwards to establish tight seal with the cylinder wall wherever the cylinder has been worn out of round.

The interposition of the strip 17 between the marcel ring 18 and the ring proper 9 results in more efficient operation of the marcel ring. In the first place, being composed of relatively hard steel, it presents less friction to the movement of the marcel ring 18 thereupon than upon the cast iron ring 9. Hence the expansion and contraction of the cast iron ring 9 resulting from the force exerted by the marcel ring 18 is facilitated. In the second place, the strip 17 prevents the crests 19 of the marcel ring 18 from dropping into the notches 11. Where no such provision is made, wherever a crest of the marcel ring does drop into one of the notches, the amount of force that the marcel ring can exert toward expanding the piston ring 9, is materially reduced. Further, such engagement of a crest within one of the notches would prevent relative motion of the marcel ring and piston ring proper.

It will be observed that pockets 23 are formed by the notches 11 between the cast iron ring and the strip 17, for the reception and retention of lubricating oil. Each of the pockets 23 is in communication with the circumferential groove 13 through one of the bleeders 16, since the bleeders extend from the groove 13 into the notches 11. Thus a supply of lubricating oil is maintained inside the cast iron ring 9, which is always readily available to lubricate the walls of the ring groove 6 and to keep the metal in best condition for most efficient operation and minimum wear.

Another advantage of my invention lies in the relative ease of forming the bleeders 16. It is not necessary to drill through the ring 9 since the bleeders 16 are automatically formed by cutting the groove 13 to such depth that it intercepts the notches 11. This operation is materially simpler than any of the old methods of cutting bleeders through the cast iron rings.

I claim:

1. A device of the character described comprising a piston ring having a circumferential groove in its outer surface and a plurality of notches in its inner surface, said notches intercepting said groove to form bleeders through the ring, an expander disposed inside the piston ring, and a flat strip interposed between the piston ring and the expander.

2. A device of the character described comprising a piston ring having a circumferential groove in its outer surface and a plurality of notches in its inner surface, an expander disposed inside the piston ring, and a flat strip interposed between the piston ring and the expander.

3. A device of the character described comprising a piston ring having a plurality of notches in its inner surface, an expander disposed inside the piston ring, and a flat strip interposed between the piston ring and the expander.

4. A device of the character described comprising a piston ring having a plurality of rounded notches in its inner surface, an expander disposed inside the piston ring, and a flat strip interposed between the piston ring and the expander.

5. A device of the character described comprising a piston ring having a plurality of notches in its inner surface and bleeders extending through the ring from its outer surface into said notches, an expander disposed inside the piston ring, and a flat strip interposed between the piston ring and the expander.

6. A device of the character described comprising a piston ring having a plurality of notches in its inner surface and bleeders extending through the ring from its outer surface to its inner surface, an expander disposed inside the piston ring, and a flat strip interposed between the piston ring and the expander.

7. A device of the character described comprising a piston ring formed of cast iron, an expander on the interior of the piston ring to assist in expanding the same, and a strip of material presenting a relatively smooth frictionless surface as compared with that of cast iron interposed between the piston ring and the marcel ring.

8. A device of the character described comprising a piston ring formed of cast iron, an expander on the interior of the piston ring to assist in expanding the same, and a strip of material presenting a relatively smooth surface which is harder than that of cast iron interposed between the piston ring and the marcel ring.

RALPH G. ZELEDON.